Aug. 20, 1929.  P. H. GEIGER  1,725,709
ELECTRICAL APPARATUS
Filed Oct. 26, 1923
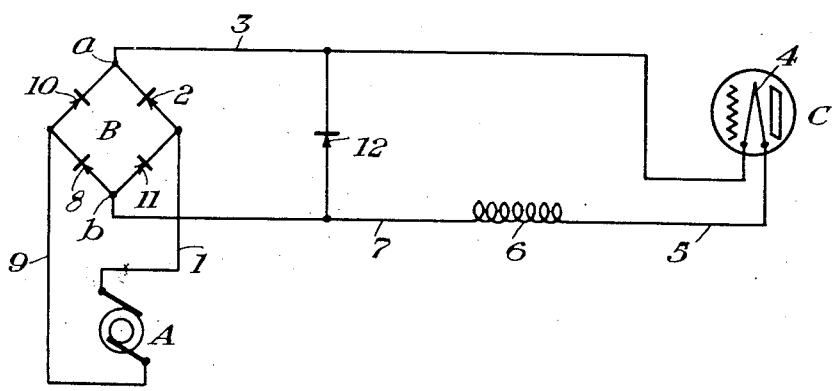
INVENTOR:
Paul H. Geiger,
by A. R. Kendall,
His attorney Patented Aug. 20, 1929.

1,725,709

UNITED STATES PATENT OFFICE.

PAUL H. GEIGER, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRICAL APPARATUS.

Application filed October 26, 1923. Serial No. 671,039.

My invention relates to electrical apparatus, and particularly to apparatus of the type comprising means for supplying uni-directional current from a source of periodic energy to a current consuming device.

I will describe one form of apparatus embodying my invention, and will then point out the novel features thereof in the claim.

The accompanying drawing is a diagrammatic view showing one form of electrical apparatus embodying my invention.

Referring to this drawing the reference character A designates a source of periodic energy such as an alternator. The reference character C designates some form of current consuming device to which it is desirable to supply uni-directional current, and as here shown is a three-element electron tube having a filament 4 arranged to be heated by the passage of an electrical current. The alternating current supplied by alternator A is rectified by some suitable form of rectifier B. As here shown the rectifier is of the copper oxide type illustrated and described in United States Letters Patent No. 1,640,335 granted to Lars O. Grondahl on the 23rd day of August, 1927, for uni-directional current carrying devices. This rectifier comprises four asymmetrical units, that is, units which offer considerably higher resistance to current flowing through them in one direction than to current flowing in the other direction. The arrows indicate the direction of least resistance.

During one half of each cycle, therefore, current flows from alternator A, through wire 1, unit 2, wire 3, filament 4 of tube C, wire 5, an inductive reactance 6, wire 7, unit 8, and wire 9, back to alternator A. During the other half of each cycle current flows from alternator A, through wire 9, unit 10, wire 3, filament 4 of tube C, wire 5, reactance 6, wire 7, unit 11, and wire 1 back to alternator A. It is thus plain that alternating current supplied to rectifier B is translated into uni-directional current which is in turn supplied to device C, the terminal $a$ of rectifier B being at all times electro positive with respect to terminal $b$.

It will be noted, therefore, that the load on the rectifier B is an inductive load which, in the form here shown, comprises a non-inductive filament 4 and an inductive reactance 6. Any other form of inductance load may, however, be used.

With such a device, the reactance 6 tends to smooth out the pulsations in the current passing through them. This "smoothing out" is due to the current which is induced in reactance 6 during the decrease of the current supplied by rectifier B. The direction of this induced current is such as to tend to prevent the decrease of the current through the circuit. With only the apparatus thus far described however, the induced current must all flow through rectifier B, which has a comparatively high resistance. I propose to connect a uni-directional current carrying device 12 across terminals $a$ and $b$ of rectifier B to provide a shunt path for this current. It will be plain that during that part of the wave of the rectified current in which this current is decreasing, there will be induced in reactance 6 a current part of which will flow through the rectifier B and part of which will flow through wire 7, device 12, wire 3, filament 4 of tube C, and wire 5 back to reactance 6. As shown in the drawing, each leg of rectifier B has one asymmetrical unit, and 12 also has a single unit. If the units are all similar, the resistance offered by 12 to the induced current is substantially equal to the total resistance offered to this current by rectifier B which has two parallel paths each including two units in series. With the device 12 included in the circuit, then, the total resistance offered to the induced current is one-half the resistance which would be offered to this current if the device 12 were omitted. The resistance can be still further reduced by constructing device 12 with several units in parallel.

Since the resistance of device 12 to currents flowing from wire 3 to wire 7 is comparatively large, the current through this device in this direction is very small and hence the power lost is negligible.

Device 12 may be an asymmetrical unit of any suitable form such as a copper member having formed thereon a coating of copper oxide.

Experimentation has demonstrated that with apparatus constructed in this manner the current through the current consuming device C is substantially without pulsations and hence the apparatus is particularly adapted, though by no means limited to, use in connection with electron tubes where the presence of such pulsations are undesirable.

Although I have herein shown and described only one form of electrical apparatus embodying my invention, it is understood that various changes and modifications may be made therein within the scope of the appended claim without departing from the spirit and scope of my invention.

Having thus described my invention what I claim is:

In combination, a source of alternating current, a rectifier having its input terminals connected with said source, a load requiring direct current connected with the output terminals of said rectifier, an inductive reactance interposed between one output terminal of said rectifier and said load, and an inert asymmetric unit connected across the terminals of said rectifier in such direction as to freely conduct the current induced in said reactance during decreases in the current supplied by said rectifier.

In testimony whereof I affix my signature.

PAUL H. GEIGER.